US010668965B2

(12) United States Patent
Czinger et al.

(10) Patent No.: US 10,668,965 B2
(45) Date of Patent: Jun. 2, 2020

(54) NODES WITH INTEGRATED ADHESIVE PORTS AND CHANNELS FOR CONSTRUCTION OF COMPLEX STRUCTURES

(71) Applicant: Divergent Technologies, Inc., Los Angeles, CA (US)

(72) Inventors: Kevin Robert Czinger, Santa Monica, CA (US); William Bradley Balzer, Santa Monica, CA (US); Praveen Varma Penmetsa, Long Beach, CA (US); Zachary Meyer Omohundro, Hermosa Beach, CA (US); Matthew M. O'Brien, Hermosa Beach, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 0 days.

(21) Appl. No.: 15/716,217

(22) Filed: Sep. 26, 2017

(65) Prior Publication Data

US 2018/0037282 A1 Feb. 8, 2018

Related U.S. Application Data

(62) Division of application No. 14/713,272, filed on May 15, 2015, now Pat. No. 9,884,663.
(Continued)

(51) Int. Cl.
*B60K 37/00* (2006.01)
*B62D 65/02* (2006.01)
(Continued)

(52) U.S. Cl.
CPC ........... *B62D 65/02* (2013.01); *B62D 23/005* (2013.01); *B62D 27/023* (2013.01)

(58) Field of Classification Search
CPC ... H01R 2103/00; B29C 66/545; B29C 66/71; B60T 8/282; D21F 5/021; F26B 13/183;
(Continued)

(56) References Cited

U.S. PATENT DOCUMENTS 2,421,351 A 5/1947 Page
3,100,555 A * 8/1963 Ashton ............... B29C 66/5221
174/45 R
(Continued)

FOREIGN PATENT DOCUMENTS

CA 2818928 A1 6/2012
CN 201400267 Y 2/2010
(Continued)

OTHER PUBLICATIONS

US 9,202,136 B2, 12/2015, Schmidt et al. (withdrawn)
(Continued)

*Primary Examiner* — Kiran B Patel
(74) *Attorney, Agent, or Firm* — Arent Fox LLP

(57) ABSTRACT

A joint design to connect tubes for a space frame, where a space frame may be a vehicle chassis, is provided. The joint may connect carbon fiber tubes and may be designed with different shapes and configurations. The joint may include acceptor ports that may mate with a tube and simultaneously contact an inner surface and outer surface of the tube for a strong connection. The joint may also include centering features which may create a space between a surface of the tube and a surface of the joint through which adhesive may flow.

5 Claims, 7 Drawing Sheets

Related U.S. Application Data

(60) Provisional application No. 61/994,781, filed on May 16, 2014.

(51) Int. Cl.
  *B62D 23/00* (2006.01)
  *B62D 27/02* (2006.01)

(58) Field of Classification Search
  CPC ....... H01L 2924/00014; H01L 2924/00; A61B 17/12022; A61B 10/025
  See application file for complete search history.

(56) References Cited

U.S. PATENT DOCUMENTS

| | | | |
|---|---|---|---|
| 3,292,969 A | 12/1966 | Eggert, Jr. | |
| 3,881,830 A * | 5/1975 | Kato ................... | F16B 7/0446 403/171 |
| 4,145,068 A * | 3/1979 | Toyomasu ........... | B22D 19/045 280/281.1 |
| 4,339,123 A | 7/1982 | Rich | |
| 4,478,252 A | 10/1984 | McLoughlin | |
| 4,489,659 A | 12/1984 | Kamohara | |
| 4,509,879 A | 4/1985 | Pearce | |
| 4,648,616 A | 3/1987 | Diekman | |
| 4,660,345 A * | 4/1987 | Browning .............. | B62D 21/08 164/63 |
| 4,721,407 A * | 1/1988 | Liu ........................ | B62K 19/22 403/205 |
| 4,735,355 A * | 4/1988 | Browning .............. | B62D 21/08 228/138 |
| 4,804,209 A | 2/1989 | Fischer | |
| 4,900,049 A * | 2/1990 | Tseng .................... | B62K 19/22 156/294 |
| 4,902,160 A | 2/1990 | Jeng | |
| 5,100,162 A | 3/1992 | Lo | |
| 5,116,071 A | 5/1992 | Calfee | |
| 5,129,666 A * | 7/1992 | Lai ........................ | B62K 19/22 280/281.1 |
| 5,203,226 A | 4/1993 | Hongou et al. | |
| 5,271,784 A | 12/1993 | Chen | |
| 5,272,805 A | 12/1993 | Akeel et al. | |
| 5,346,237 A | 9/1994 | Wang | |
| 5,404,630 A * | 4/1995 | Wu ........................ | B29C 65/565 156/165 |
| 5,435,110 A * | 7/1995 | Stol ...................... | B62D 23/005 403/170 |
| 5,458,393 A | 10/1995 | Benedyk | |
| 5,466,086 A * | 11/1995 | Goto ..................... | E04B 1/2604 403/267 |
| 5,720,092 A * | 2/1998 | Ni ......................... | B62D 23/005 228/155 |
| 5,742,385 A | 4/1998 | Champa | |
| 5,848,853 A | 12/1998 | Clenet | |
| 5,917,726 A | 6/1999 | Pryor | |
| 5,937,496 A * | 8/1999 | Benoit ................... | B21D 26/14 280/281.1 |
| 5,944,441 A | 8/1999 | Schutze | |
| 5,990,444 A | 11/1999 | Costin | |
| 6,010,155 A | 1/2000 | Rinehart | |
| 6,010,182 A * | 1/2000 | Townsend .............. | B62D 21/12 296/191 |
| 6,096,249 A | 8/2000 | Yamaguchi | |
| 6,140,602 A | 10/2000 | Costin | |
| 6,170,596 B1 | 1/2001 | Triarsi et al. | |
| 6,199,916 B1 | 3/2001 | Klinger | |
| 6,247,869 B1 | 6/2001 | Lichvar | |
| 6,250,533 B1 | 6/2001 | Otterbein et al. | |
| 6,252,196 B1 | 6/2001 | Costin et al. | |
| 6,270,104 B1 * | 8/2001 | Nelson .................. | B29C 70/446 280/281.1 |
| 6,287,042 B1 | 9/2001 | Eriksson | |
| 6,318,642 B1 | 11/2001 | Goenka et al. | |
| 6,349,237 B1 | 2/2002 | Koren et al. | |
| 6,365,057 B1 | 4/2002 | Whitehurst et al. | |
| 6,389,697 B1 * | 5/2002 | Benoit .................. | B21D 26/14 29/897.2 |
| 6,391,251 B1 | 5/2002 | Keicher et al. | |
| 6,409,930 B1 | 6/2002 | Whitehurst et al. | |
| 6,468,439 B1 | 10/2002 | Whitehurst et al. | |
| 6,554,345 B2 | 4/2003 | Jonsson | |
| 6,585,151 B1 | 7/2003 | Ghosh | |
| 6,591,871 B2 * | 7/2003 | Smith ....................... | B32B 1/08 138/137 |
| 6,644,721 B1 | 11/2003 | Miskech et al. | |
| 6,665,935 B2 | 12/2003 | Nguyen | |
| 6,733,047 B1 * | 5/2004 | Stieler ................. | F16L 37/0987 285/21.1 |
| 6,811,744 B2 | 11/2004 | Keicher et al. | |
| 6,866,497 B2 | 3/2005 | Saiki | |
| 6,902,208 B1 | 6/2005 | Mobley | |
| 6,919,035 B1 | 7/2005 | Clough | |
| 6,926,970 B2 | 8/2005 | James et al. | |
| 7,036,707 B2 | 5/2006 | Aota | |
| 7,152,292 B2 | 12/2006 | Hohmann et al. | |
| 7,270,346 B2 | 9/2007 | Rowe et al. | |
| 7,300,078 B2 | 11/2007 | Yamamoto | |
| 7,322,106 B2 | 1/2008 | Marando | |
| 7,341,285 B2 | 3/2008 | McPherson | |
| 7,344,186 B1 | 3/2008 | Hausler et al. | |
| 7,500,373 B2 | 3/2009 | Quell | |
| 7,500,802 B2 | 3/2009 | Patberg | |
| 7,586,062 B2 | 9/2009 | Heberer | |
| 7,637,134 B2 | 12/2009 | Burzlaff et al. | |
| 7,665,800 B2 | 2/2010 | Werner | |
| 7,710,347 B2 | 5/2010 | Gentilman et al. | |
| 7,712,828 B2 | 5/2010 | Julliard | |
| 7,716,802 B2 | 5/2010 | Stern et al. | |
| 7,745,293 B2 | 6/2010 | Yamazaki et al. | |
| 7,766,123 B2 | 8/2010 | Sakurai et al. | |
| 7,837,233 B2 | 11/2010 | Johnston | |
| 7,852,388 B2 | 12/2010 | Shimizu et al. | |
| 7,908,922 B2 | 3/2011 | Zarabadi et al. | |
| 7,951,324 B2 | 5/2011 | Naruse et al. | |
| 7,967,522 B2 | 6/2011 | Goad | |
| 7,971,887 B2 | 7/2011 | Dorr | |
| 8,070,216 B2 | 12/2011 | Defoy et al. | |
| 8,094,036 B2 | 1/2012 | Heberer | |
| 8,163,077 B2 | 4/2012 | Eron et al. | |
| 8,163,116 B2 * | 4/2012 | Riley ................... | B62D 23/005 156/294 |
| 8,276,771 B2 | 10/2012 | Schuetz | |
| 8,286,236 B2 | 10/2012 | Jung et al. | |
| 8,289,352 B2 | 10/2012 | Vartanian et al. | |
| 8,297,096 B2 | 10/2012 | Mizumura et al. | |
| 8,317,257 B2 | 11/2012 | Rolfe et al. | |
| 8,349,122 B2 | 1/2013 | Castaneda | |
| 8,354,170 B1 | 1/2013 | Henry et al. | |
| 8,383,028 B2 | 2/2013 | Lyons | |
| 8,397,463 B2 * | 3/2013 | Allred, III .............. | E04C 3/08 403/170 |
| 8,408,036 B2 | 4/2013 | Reith et al. | |
| 8,429,754 B2 | 4/2013 | Jung et al. | |
| 8,437,513 B1 | 5/2013 | Derakhshani et al. | |
| 8,444,903 B2 | 5/2013 | Lyons et al. | |
| 8,452,073 B2 | 5/2013 | Taminger et al. | |
| 8,528,291 B2 * | 9/2013 | Allred, III .............. | E04C 3/08 135/909 |
| 8,544,587 B2 | 10/2013 | Holroyd et al. | |
| 8,590,654 B2 | 11/2013 | Kerner et al. | |
| 8,599,301 B2 | 12/2013 | Dowski, Jr. et al. | |
| 8,606,540 B2 | 12/2013 | Haisty et al. | |
| 8,610,761 B2 | 12/2013 | Haisty et al. | |
| 8,631,996 B2 | 1/2014 | Quell et al. | |
| 8,675,925 B2 | 3/2014 | Derakhshani et al. | |
| 8,678,060 B2 | 3/2014 | Dietz et al. | |
| 8,686,314 B2 | 4/2014 | Schneegans et al. | |
| 8,686,997 B2 | 4/2014 | Radet et al. | |
| 8,694,284 B2 | 4/2014 | Berard | |
| 8,720,876 B2 | 5/2014 | Reith et al. | |
| 8,752,166 B2 | 6/2014 | Jung et al. | |
| 8,755,923 B2 | 6/2014 | Farahani et al. | |
| 8,777,994 B2 | 7/2014 | Triplett | |

(56) References Cited

U.S. PATENT DOCUMENTS

| | | |
|---|---|---|
| 8,787,628 B1 | 7/2014 | Derakhshani et al. |
| 8,818,771 B2 | 8/2014 | Gielis et al. |
| 8,873,238 B2 | 10/2014 | Wilkins |
| 8,961,026 B2 | 2/2015 | Re |
| 8,978,535 B2 | 3/2015 | Ortiz et al. |
| 9,006,605 B2 | 4/2015 | Schneegans et al. |
| 9,071,436 B2 | 6/2015 | Jung et al. |
| 9,101,979 B2 | 8/2015 | Hofmann et al. |
| 9,104,921 B2 | 8/2015 | Derakhshani et al. |
| 9,126,365 B1 | 9/2015 | Mark et al. |
| 9,128,476 B2 | 9/2015 | Jung et al. |
| 9,138,924 B2 | 9/2015 | Yen |
| 9,149,988 B2 | 10/2015 | Mark et al. |
| 9,156,205 B2 | 10/2015 | Mark et al. |
| 9,186,848 B2 | 11/2015 | Mark et al. |
| 9,244,986 B2 | 1/2016 | Karmarkar |
| 9,248,611 B2 | 2/2016 | Divine et al. |
| 9,254,535 B2 | 2/2016 | Buller et al. |
| 9,266,566 B2 | 2/2016 | Kim |
| 9,269,022 B2 | 2/2016 | Rhoads et al. |
| 9,327,452 B2 | 5/2016 | Mark et al. |
| 9,329,020 B1 | 5/2016 | Napoletano |
| 9,332,251 B2 | 5/2016 | Haisty et al. |
| 9,346,127 B2 | 5/2016 | Buller et al. |
| 9,375,836 B2 | 6/2016 | Su |
| 9,389,315 B2 | 7/2016 | Bruder et al. |
| 9,399,256 B2 | 7/2016 | Buller et al. |
| 9,403,235 B2 | 8/2016 | Buller et al. |
| 9,418,193 B2 | 8/2016 | Dowski, Jr. et al. |
| 9,457,514 B2 | 10/2016 | Schwärzler |
| 9,469,057 B2 | 10/2016 | Johnson et al. |
| 9,476,538 B2 | 10/2016 | Kim |
| 9,478,063 B2 | 10/2016 | Rhoads et al. |
| 9,481,402 B1 | 11/2016 | Muto et al. |
| 9,486,878 B2 | 11/2016 | Buller et al. |
| 9,486,960 B2 | 11/2016 | Paschkewitz et al. |
| 9,488,303 B2 | 11/2016 | Stefani |
| 9,502,993 B2 | 11/2016 | Deng |
| 9,525,262 B2 | 12/2016 | Stuart et al. |
| 9,533,526 B1 | 1/2017 | Nevins |
| 9,555,315 B2 | 1/2017 | Aders |
| 9,555,580 B1 | 1/2017 | Dykstra et al. |
| 9,557,856 B2 | 1/2017 | Send et al. |
| 9,566,742 B2 | 2/2017 | Keating et al. |
| 9,566,758 B2 | 2/2017 | Cheung et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,595,795 B2 | 3/2017 | Lane et al. |
| 9,597,843 B2 | 3/2017 | Stauffer et al. |
| 9,600,929 B1 | 3/2017 | Young et al. |
| 9,609,755 B2 | 3/2017 | Coull et al. |
| 9,610,737 B2 | 4/2017 | Johnson et al. |
| 9,611,667 B2 | 4/2017 | Gangarao et al. |
| 9,616,623 B2 | 4/2017 | Johnson et al. |
| 9,626,487 B2 | 4/2017 | Jung et al. |
| 9,626,489 B2 | 4/2017 | Nilsson |
| 9,643,361 B2 | 5/2017 | Liu |
| 9,662,840 B1 | 5/2017 | Buller et al. |
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |

(56) References Cited

U.S. PATENT DOCUMENTS

| | | |
|---|---|---|
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 2001/0037795 A1 | 11/2001 | Stieler |
| 2001/0048223 A1 | 12/2001 | Campbell |
| 2003/0102668 A1 | 6/2003 | Tarbutton et al. |
| 2003/0230443 A1 | 12/2003 | Cramer et al. |
| 2004/0134592 A1 | 7/2004 | Johnson |
| 2005/0127668 A1 | 6/2005 | Mobley et al. |
| 2005/0280185 A1 | 12/2005 | Russell et al. |
| 2006/0108783 A1 | 5/2006 | Ni et al. |
| 2009/0014121 A1 | 1/2009 | McPherson |
| 2010/0288569 A1 | 11/2010 | Fish |
| 2011/0167758 A1 | 7/2011 | Daadoush |
| 2011/0227331 A1 | 9/2011 | Church |
| 2014/0241790 A1 | 8/2014 | Woleader et al. |
| 2014/0277669 A1 | 9/2014 | Nardi et al. |
| 2015/0052025 A1 | 2/2015 | Apsley et al. |

(56) References Cited

U.S. PATENT DOCUMENTS

| | | |
|---|---|---|
| 2016/0016229 A1 | 1/2016 | Czinger |
| 2016/0061381 A1 | 3/2016 | Kotliar |
| 2017/0001368 A1 | 1/2017 | Czinger |
| 2017/0050677 A1 | 2/2017 | Czinger |
| 2017/0057558 A1 | 3/2017 | Hillebrecht et al. |
| 2017/0113344 A1 | 4/2017 | Schönberg |
| 2017/0341309 A1 | 11/2017 | Piepenbrock et al. |

FOREIGN PATENT DOCUMENTS

| | | |
|---|---|---|
| CN | 201484210 U | 5/2010 |
| CN | 103341625 A | 10/2013 |
| CN | 203887169 U | 10/2014 |
| CN | 105501299 A | 4/2016 |
| DE | 10309631 A1 | 9/2004 |
| DE | 201620105052 U1 | 4/2017 |
| EP | 0373858 A2 | 6/1990 |
| EP | 0450358 A1 | 10/1991 |
| EP | 2301826 A1 | 3/2011 |
| EP | 15182959.5 | 8/2015 |
| FR | 1114386 A | 4/1956 |
| GB | 2049567 A | 12/1980 |
| JP | S63-6990 U | 1/1988 |
| JP | H2-107589 U | 8/1990 |
| JP | H2-258490 A | 10/1990 |
| JP | 2004216425 A | 8/2004 |
| JP | 2011-213312 A | 10/2011 |
| JP | 2011213312 A | 10/2011 |
| KR | 20160056634 A | 5/2016 |
| WO | 1996036455 A1 | 11/1996 |
| WO | 1996036525 A1 | 11/1996 |
| WO | 1996038260 A1 | 12/1996 |
| WO | 199949150 A1 | 9/1999 |
| WO | 20010129143 A1 | 4/2001 |
| WO | 2002090146 A2 | 11/2002 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
First Office Action dated Apr. 2, 2018, regarding China Application No. 201580038194.7.
3D Printing Transforms the Automotive Industry. Published Jan. 20, 2016; Accessed Dec. 27, 2016. https://www.sculpteo.com/blog/2016/01/20/3d-printing-transforms-the-automotive-industry.
Design Democracy: Drones Meet 3D Printed Cars for a Self-Driven Future. Published Nov. 9, 2016; Accessed Dec. 27, 2016. https://3dprintingindustry.com/news/design-democracy-drones-meet-3d-printed-cars-self-driven-future-98125/.
LM3D Home Page. Published 2015; Accessed Dec. 27, 2016. https://localmotors.com/3d-printed-car/.
Stratasys Automotive Website, Published 2016, Accessed Dec. 27, 2016, http://www.stratasys.com/industries/automotive.
International search report and written opinion dated Sep. 20, 2016 for PCT Application No. PCT/US2016/035893.
Architecture>Grasshopper (online), Andrea Springer, 2013, Accessed Oct. 21, 2015, Retrieved from the internet: http://www.andreaspringerstudio.com/architecture/grasshopper/.
International search report and written opinion dated Oct. 6, 2015 for PCT Application No. US2015/038449.
Pottish; Nancy., Carbon fiber race car technology hits the streets, Published online Jul. 1, 2005, Accessed Oct. 5, 2015, http://www.compositesworld.com/articles/carbon-fiber-race-car-technolobv-hits-the-streets.
International search report and written opinion dated Aug. 24, 2015 for PCT Application No. US2015/030996.
"3D Prints of the World" Website, Accessed Jul. 8, 2015, http://3dprintsoftheworld.com/object/vrz-1-tack-bike-frame-3d-printed-lugs.
Androole., Custom 3D Printed Carbon Fiber Bike Frame. Accessed Jul. 8, 2015. http://m/vw.instructables.com/id/Custom-3D-Printed-Carbon-Fiber-Bike-Framer.
Chalcraft; E, "Road-ready 3D-printed car on the way. Published Mar. 7, 2013; Accessed Jul. 8, 2015. http://wym.dezeen.com/2013/03/07/road-ready-3d-printed-car-on-the-way/".
Coldewey; D., Fine Ride: World's First 3-D Printed Bike Frame Weighs Just 3 Pounds. Published Feb. 14, 2014; Accessed Jul. 8, 2015, http://www.nbcnews.com/tech/innovation/fine-ride-worlds-first-3-d-printed-bike-frame-weighs-in 30761.
Flying; Machine Website., "3D Printed Titanium: Bike of the Future. Accessed Jul. 8, 2015. http://wwitt.flyingmachine.com.au/3d-printed-titanium-bike-of-the-future/".
George; A., "3-D Printed Car Is as Strong as Steel, Half the Weight, and Nearing Production. Published Feb. 27, 2013; Accessed Jul. 8, 2015. http://wywv.wired.com/2013/02/3d-printed-car/".
George; A., "The Germans Have Figured Out How to 3-D Print Cars. Published Mar. 19, 2014; Accessed Jul. 8, 2015. http://www.wired.com/2014/03/edag-3-d-printed-car/".
Supplementary European Search Report dated Jan. 18, 2018, regarding EP15793557 (associated with PCT/US2015/030996).
Notice of Reasons for Rejection dated Mar. 26, 2019, regarding Japanese Application No. JP2016-567968.
Extended European Search Report received in European Patent Application No. 19208705.4, dated Mar. 11, 2020.

* cited by examiner

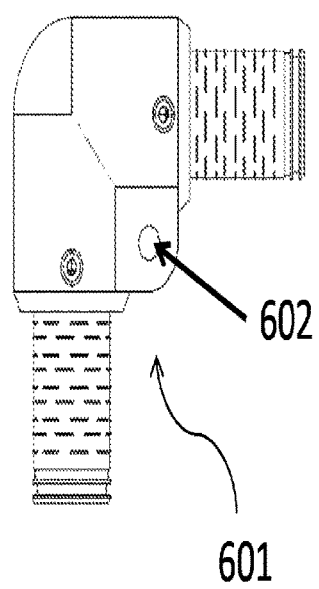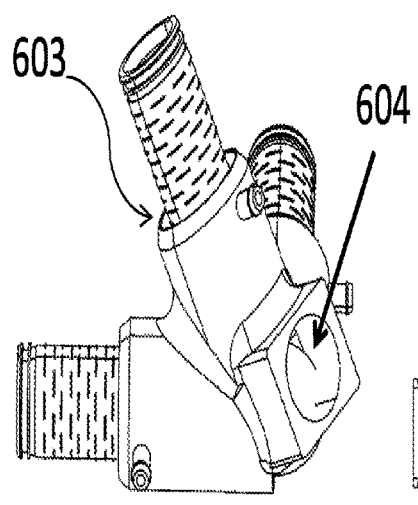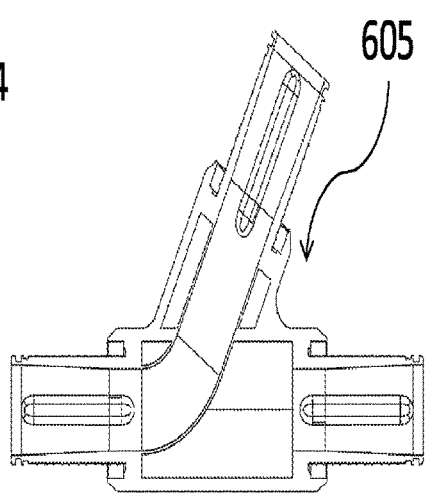
FIG. 6a
FIG. 6b
FIG. 6c

NODES WITH INTEGRATED ADHESIVE PORTS AND CHANNELS FOR CONSTRUCTION OF COMPLEX STRUCTURES

CROSS-REFERENCE TO RELATED APPLICATIONS

This application is a divisional of, and claims priority to, U.S. patent application Ser. No. 14/713,272, filed May 15, 2015, now allowed, which claims priority to U.S. Provisional Patent Application Ser. No. 61/994,781 filed May 16, 2014, both of which are entirely incorporated by reference as if fully set forth herein.

BACKGROUND

Tube frame chassis construction is used extensively in low volume and high performance vehicle design with the advantages of low tooling costs, design flexibility, and the ability to produce high efficiency structures. Existing fabrication methods for tube frame chassis require a significant amount of labor to cut and notch all tubes to the correct length, also a skilled welder is needed to bind each tube connection joint. The use of carbon fiber as the material for the tubes in the chassis frame reduces the labor and tooling cost of construction. However, challenges arise with connecting the carbon fiber tubes at intersections because these tubes cannot be welded.

SUMMARY

A need exists for a joint system to connect carbon fiber tubes. A joint design is provided that may join carbon fiber tubes to form a structurally rigid three-dimensional space frame, where an example of a space frame may be a vehicle chassis. The space frame formed by the disclosed joint system in connection with carbon fiber tubes may advantageously provide a low-cost high-efficiency space frame fabrication process suitable for vehicle or other structural manufacture processes.

The joints described in this disclosure may comprise various tube engagement protrusions that can engage both the inner and outer diameter of a connecting tube. An advantage of engagement of the inside and outside surfaces of the connecting tube may be increased structural rigidity. Furthermore the joints described in this disclosure may comprise centering features to force the center of a connecting tube and the center of an adjoining joint protrusion to be co-axial. The centering features may provide a gap between an outer surface of inner region of a joint and an inner surface of a connecting tube, through which adhesive may be applied.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

FIG. 6a shows an example of a joint with a flange for integration with other construction components.

FIG. 6b shows an example of a joint with openings for routing of fluid and/or electrical components.

FIG. 6c shows a cross sectional view of an example of a joint with openings for routing of fluid and/or electrical components.

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

This disclosure provides a joint member for connection of a plurality of connecting tubes, which may be used for the forming of a light weight space frame. An example of a space frame may be a vehicle chassis. Various aspects of the described disclosure may be applied to any of the applications identified here in addition to any other structures comprising a joint/tube frame construction. It shall be understood that different aspects of the invention may be appreciated individually, collectively, or in combination with each other.

Figure 1:
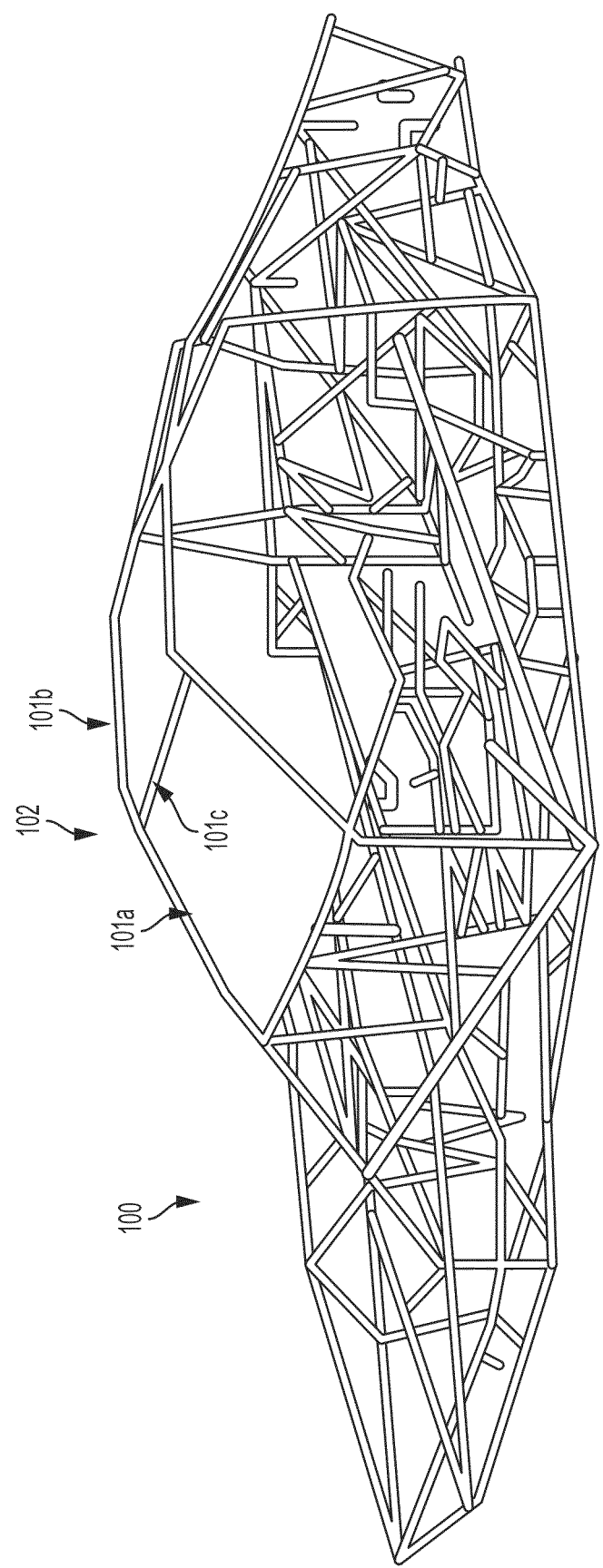
FIG. 1 shows a vehicle chassis including connecting tubes connected by one or more joint, in accordance with an embodiment of the invention.

FIG. 1 shows a vehicle chassis 100 including connecting tubes 101a, 101b, 101c connected by one or more nodes 102, in accordance with an embodiment of the invention. A multi-port node, or joint member, may be provided to connect carbon fiber tubes to form a two or three-dimensional structure. The structure may be a frame. In one example, a two dimensional structure may be a planar frame, while a three dimensional structure may be space frame. A space frame may enclose a volume therein. In some examples, a three dimensional space frame structure may be a vehicle chassis. The vehicle chassis may have a length, width, and height that may enclose a space therein. The length, width, and height of the vehicle chassis may be greater than a thickness of a connecting tube. Any description herein of a vehicle chassis or any type of chassis may be applied to any type of space frame, and vice versa.

A vehicle chassis may form the framework of a vehicle. A vehicle chassis may provide the structure for placement of body panels of a vehicle, where body panels may be door panels, roof panels, floor panels, or any other panels forming the vehicle enclosure. Furthermore the chassis may be the structural support for the wheels, drive train, engine block, electrical components, heating and cooling systems, seats, or storage space. A vehicle may be a passenger vehicle capable of carrying at least about 1 or more, 2 or more, 3 or more, 4 or more, 5 or more, 6 or more, 7 or more, 8 or more, ten or more, twenty or more, or thirty or more passengers. Examples of vehicles may include, but are not limited to sedans, trucks, buses, vans, minivans, station wagons, RVs, trailers, tractors, go-carts, automobiles, trains, or motorcycles, boats, spacecraft, or airplanes. A space frame may be provided for a vehicle, or for any other type of structure including, but no limited to, towers, buildings, bicycles, tricycles, bridges, lighting structures, furniture, stages, trusses, or walls. Any description herein of a chassis or vehicle chassis may apply to any type of space frame. Similarly, any description herein of nodes that may be used to connect tubes in a vehicle chassis may be applied to any type of space frame.

The vehicle chassis may provide a form factor that matches the form factor of the type of vehicle. Depending on the type of vehicle, the vehicle chassis may have varying configurations. The vehicle chassis may have varying levels of complexity. In some instances, a three-dimensional space frame may be provided that may provide an outer framework for the vehicle. The outer framework may have body panels to form a three-dimensional enclosure. Optionally, inner supports or components may be provided. Different layouts of multi-port nodes and connecting tubes may be provided to accommodate different vehicle chassis configurations. Nodes may be able to support tubes in a two or three-dimensional plane. For example, a multi-prong node may be configured to connect tubes that do not all fall within the same plane. The tubes connected to a multi-prong node may be provided in a three-dimensional fashion and may span three orthogonal axes. In alternate embodiments, some nodes may connect tubes that may share a two-dimensional plane.

The connecting tubes 101a, 101b, 101c of the vehicle may be formed from a carbon fiber material. Examples of composite materials may include high modulus carbon fiber composite, high strength carbon fiber composite, plain weave carbon fiber composite, harness satin weave carbon composite, low modulus carbon fiber composite, or low strength carbon fiber composite. In alternate embodiments, the tubes may be formed from other materials, such as plastics, polymers, metals, or metal alloys. The connecting tubes may be formed from rigid materials. The connecting tubes may have varying dimensions. For example, different connecting tubes may have different lengths. For example, the connecting tubes may have lengths on the order of about 1 inch, 3 inches, 6 inches, 9 inches, 1 ft, 2 ft, 3 ft, 4 ft, 5 ft, 6 ft, 7 ft, 8 ft, 9 ft, 10 ft, 11 ft, 12 ft, 13 ft, 14 ft, 15 ft, 20 ft, 25 ft, or 30 ft. In some instances, the tubes may have the same diameter, or varying diameters. In some instances, the tubes may have diameters on the order of about 1/16", 1/8", 1/4", 1/2", 1", 2", 3", 4", 5", 10", 15", or 20".

The connecting tubes may have any cross-sectiona shape. For example, the connecting tubes may have a substantially circular shape, square shape, oval shape, hexagonal shape, or any irregular shape. The connecting tube cross-section could be an open cross section, such as a C-channel, I-beam, or angle.

The connecting tubes 101a, 101b, 101c may be hollow tubes. A hollow portion may be provided along the entire length of the tube. In some cases, the connecting tubes may have an inner surface and an outer surface. An inner diameter for the tube may correspond to an inner surface of the connecting tube. An outer diameter of the tube may correspond to an outer surface of the tube. In some embodiments, the difference between the inner diameter and the outer diameter may be less than or equal to about 1/32", 1/16", 1/8", 1/4", 1/2", 1", 2", 3", 4, or 5". A connecting tube may have two ends. The two ends may be opposing one another. In alternative embodiments, the connecting tubes may have three, four, five, six or more ends. The vehicle chassis frame may comprise carbon fiber tubes connected with joints 102.

The multi-port nodes 102 (e.g., joint members, joints, connectors, lugs) presented in this disclosure may be suitable for use in a vehicle chassis frame such as the frame shown in FIG. 1. The nodes in the chassis frame (100) may be designed to fit the tube angles dictated by the chassis design. The nodes may be pre-formed to desired geometries to permit rapid and low cost assembly of the chassis. The nodes can be reusable. In some cases, a first chassis can be built using a set of nodes and tubes. The first chassis can be disassembled and a second chassis can be built using at least a subset of the set of nodes and tubes. The first chassis and the second chassis can correspond to different types of vehicles. For example, the first chassis and the second chassis can be different size (e.g., volume, weight, carrying capacity) vehicles. In some cases, the first chassis and the second chassis can correspond to vehicles with different functions. Vehicle functions can include military use, commercial use, hauling, transporting one or more humans, and/or travel on a specified type of terrain.

A joint or node may be composed of a metallic material (e.g. aluminum, titanium, or stainless steel, brass, copper, chromoly steel, or iron), a composite material (e.g. carbon fiber), or a polymeric material (e.g. plastic). The joint can be formed from a thermally insulating material. The joint can be formed from a thermally conductive material. The joint may be formed of a substantially rigid material. The joint may be fabricated by 3D-printing, casting, by use of a mold, by machining, or by some combination of these processes.

Figure 2A:
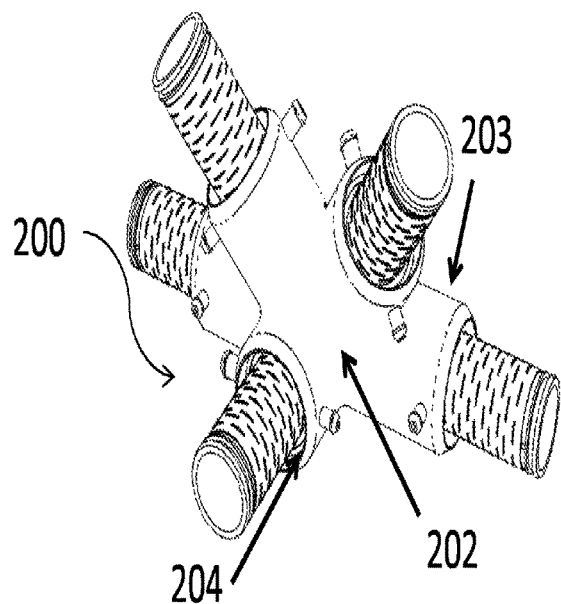
FIG. 2a shows an example of a joint having a plurality of acceptor ports in accordance with an embodiment of the invention.
Figure 2B:
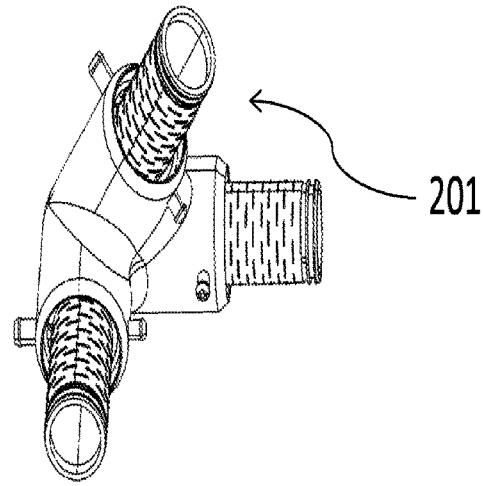
FIG. 2b shows another example of a joint having a plurality of acceptor ports in accordance with an embodiment of the invention.

FIG. 2a and FIG. 2b show examples of joints (a.k.a. nodes). FIG. 2a shows a joint, or multi-prong node, 200 with five protruding acceptor ports, or prongs, for connecting with tubes. FIG. 2b shows a joint 201 with three protruding acceptor ports for connecting tubes. A joint (i.e., multi-prong node) may have any number of protruding acceptor ports to mate with a connecting tube. For example, the joint may have at least one, two, three, four, five, six, seven, eight, nine, ten, twelve, fifteen, twenty, thirty, or fifty acceptor ports, or prongs. The joint may have less than any of the number of acceptor ports described herein. The joint may have a number of acceptor ports falling into a range between any two of the values described herein.

The joint may have a central region or hub 202. Acceptor ports 203, 204 may protrude from the central region. The central region or hub may be the portion of the joint where the acceptor ports meet. The central region or hub may have an inner protrusion. In some cases, the central region or hub may be hollow. An acceptor port may have a proximal end closer to the central region or hub. The acceptor port may have a distal end further from the central region or hub. Each acceptor port may be configured to engage with a connecting tube. An end of a connecting tube may be connected to a single acceptor port. In some examples, the connecting tube may have multiple ends. Each end may be connected to a joint. A joint may connect multiple connecting tubes to one another. In some examples, a joint may connect two, three, four, five, six, seven, eight, nine, ten or more connecting tubes to one another.

The protruding acceptor ports may have any angle relative to each other in three dimensional space, for example the angle between any two ports may be at least 1°, 5°, 10°, 15°, 20°, 30°, 45°, 60°, 75°, 90°, 105°, 120°, 135°, 150°, 165°, or 180°. In some instances, three or more ports may be provided. The three or more ports may or may not be coplanar. The ports may be able to accept round, square, oval, or irregularly shaped tubes. Different cross-sectional shapes/dimensions for connecting tubes, ports may be configured to accommodate the different shapes/dimensions of tubes, the ports themselves may have different cross-sectional shapes/dimensions. The ports may be round, square, oval, or irregularly shaped.

A joint may have an inner protrusion designed to fit inside of a connecting tube. The inner protrusion may be a portion of an acceptor port. The inner protrusion may be tapered to provide a smooth stiffness transition when inserted in a connecting tube. For example, the diameter of the inner protrusion may increase slightly closer to the central region or hub. The diameter of the inner protrusion at a distal end of the protrusion may be less than a diameter of the protrusion at a proximal end of the protrusion. The ports have dimensions such that the inner protrusion of the ports can fit inside of a connecting tube for the purpose of engagement with the inner surface area of a connecting tube.

The joint may also have a lip designed to fit over a portion of the connecting tube. The lip may be a portion of the acceptor port. The lip can be sized and shaped such that the connecting tube can fit inside the lip for purpose of engagement of the outer surface of the connecting tube. A snug fit of the tube inside of the lip may be provided.

In the case of carbon tubes, engagement on the inside surface of a tube may be tighter because carbon tubes are fabricated by winding of composite material over a mandrel. The fabrication method of winding over a mandrel allows for higher precision of the inside tube diameter than the outer diameter. Therefore the joint protrusion for engagement with the inner surface of the tube may be designed with a narrower tolerance.

The diameter of the inner protrusion designed to fit inside of a connecting tube may be at least about $1/16"$, $1/8"$, $1/4"$, $1/2"$, 1", 2", 3", 4", 5", 10", 15", or 20". Alternatively, the diameter of the inner protrusion may be less than any of the values described herein. The diameter of inner protrusion may be tapered so that its diameter varies along its length.

Figure 2C:
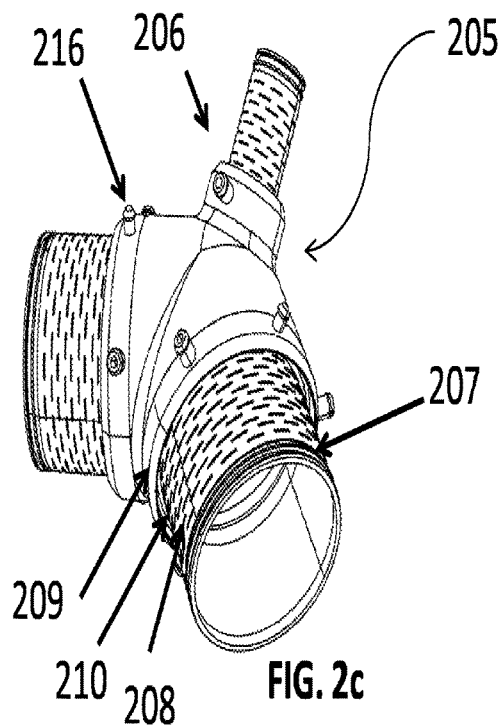
FIG. 2c shows another example of a joint having a plurality of acceptor ports with different diameters in accordance with an embodiment of the invention.

A single joint may have two or more acceptor ports with non-equal diameters. For example, the joint shown in FIG. 2c shows a joint 205 designed to accept tubes of different diameters with a smaller tube being accepted at the upper port 206 and larger tubes accepted at the lower ports 207. In another example, different ports on the same joint may be able to accept tubes with a diameter ratio between different tubes of 1:2, 1:3, 1:4, 1:5, 1:6, 2:3, 2:5, 2:7, 3:5, or 3:7. Furthermore, tubes with different cross sectional shapes may be able to fit on to different ports on the same joint. For example, a joint may have a port with an inner protrusion with all or any combination of round, oval, square, rectangular, or irregularly shapes. In other implementations, a single joint may have protrusions with equal diameters and/or the same shape.

Furthermore, the joint may be configured to fit over a connecting tube as well as inside the tube. For example, an acceptor port 207 of the joint may include an inner protrusion 208 (e.g., the protrusion) and an outer protrusion 209. The inner protrusion may be capable of being inserted into the connecting tube while the outer protrusion may overlie a portion of the connecting tube. In some cases, the lip described elsewhere herein can comprise the outer protrusion. The inner protrusion of the acceptor port may contact an inner surface of a connecting tube while the outer protrusion may contact an outer surface of the connecting tube. The inner protrusion and the outer protrusion may simultaneously contact the inner and outer surfaces of the connecting tube at the same end. In this design, the connecting tube can be surrounded on both sides by the joint when the tube and joint are connected so that the joint engages both the inner and outer diameter of the connecting tube. Both an inner and outer surface of an end of the tube may contact a portion of the joint. The contact may include a full surface contact, or a partial contact.

In the joint design configured to engage both the inner and outer diameter of the tube, the joint may have an inner protrusion that extends from the central hub, or body of the joint. The inner protrusion may be inside of the outer protrusion, with an annular region or groove separating the inner protrusion and the outer protrusion. The outer protrusion may not extend from the central hub as far as the inner protrusion. The outer protrusion can be shorter than the inner protrusion. The inner protrusion may be an inner region of the joint and the second protrusion may be an outer region of the joint. The two protrusions may be co-axial or concentric such that the radial thickness of the annular region may be uniform around the circumference of the inner protrusion. The two protrusions may form substantially concentric shapes (e.g., concentric cylinders, or any other shape).

The inner protrusion may extend further (away from the body of the joint) than the outer protrusion within which the inner protrusion is located. The inner protrusion may thus have a greater length than the outer protrusion. In some instances, the ratio of lengths between the outer protrusion and the inner protrusion may be less than or equal to about 1:1, 1:2, 1:3, 1:4, 1:5, 1:6, 1:7, 1:8, 1:10, 1:12, 1:15, 1:20, 1:25, 1:30, or 1:50. The inner protrusion may be solid. Alternatively the inner protrusion may be hollow with a wall thickness of about $1/16"$, $1/8"$, $1/4"$, $1/2"$, 1", 2", 3", 4", or 5". The outer protrusion may have a wall thickness of $1/16"$, $1/8"$, $1/4"$, ½", 1", 2", 3", 4", or 5". The outer protrusion may be a lip that only covers a small portion of the connecting tube.

Figure 2D:
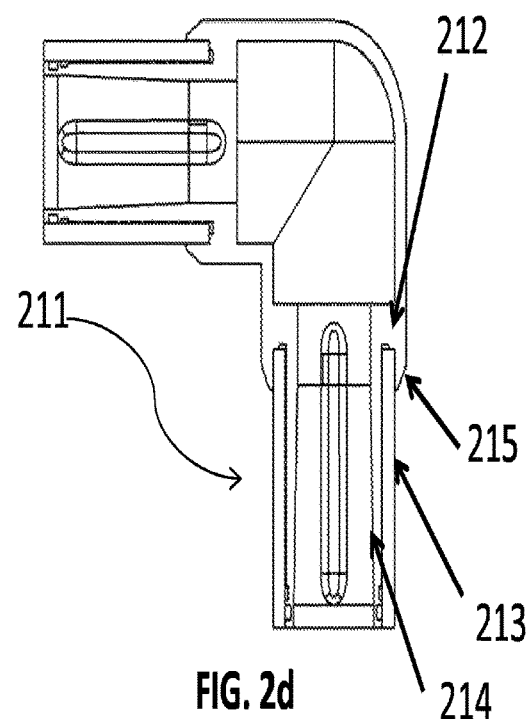
FIG. 2d shows a cross-sectional view of a joint connecting a plurality of connecting tubes.

FIG. 2d shows a cross sectional view of a joint/tube assembly 211 comprising a joint 212 and connecting tubes 213. In this embodiment the protrusion designed to fit inside of a connecting tube 213 is inside of the tube and protrusion designed to fit over the outer diameter of a connecting tube 213 mates over the connecting tube. The diameter of the region designed to fit over the outer diameter of a connecting tube may be at least 1/16", 1/8", 1/4", 1/2", 1", 2", 3", 4", 5", 10", 15", or 20".

A snug fit may be provided between the inner protrusion 214 and the connecting tube 213. Similarly, a snug fit may be provided between the outer protrusion 215 and the connecting tube. A portion of the end of the connecting tube may be sandwiched between the inner protrusion and the outer protrusion. The inner and outer protrusions may pinch over the terminal end of the connecting tube.

An annular space 210 may be provided between the inner and outer protrusions 214, 215. The annular space may form a groove or channel between the inner and outer protrusions. The annular region may provide a space for insertion of a connecting tube. When the tubes and joints are assembled the tube may be pushed some distance into the annular space between the inner and outer protrusions. The tube may be pushed into the annular region only part of the way or the tube may be pushed in such that the end of the tube contacts the back of the annular region (joint body).

The joint may mate with the inside of the tube and the outside of the tube. Each end of a tube may be accepted by an acceptor port of a joint that may simultaneously contact the inner and outer surfaces of the tube at the respective end. Engagement with both the inside and outside of the tube may result in greater structural strength. The joint protrusion may enter into a connecting tube at least ½", 1", 2", 3", 4", or 5". The region of the joint that covers over the outer diameter of the tube may cover a tube length of at least ½", 1", 2", 3", 4", or 5". The ratio of the length of the tube that is engaged on the outer diameter surface compared to the engagement of the inner diameter surface may be about 1:1, 1:2, 2:3, 1:3, 1:4, 1:5, 2:1, 3:2, 3:1, 4:1, or 5:1. The joint dimensions may be determined by the adhesive volume required to bind the joint/tube assembly with sufficient structural rigidity for the intended use.

The joint may be fabricated from a single integral piece of metallic material (e.g. aluminum, titanium, or stainless steel, brass, copper, chromoly steel, or iron), a composite material (e.g. carbon fiber), or a polymeric material (e.g. plastic). For example the joint body, inner protrusion, and outer protrusion may all be formed from a single piece of material. Alternatively the joint body, inner protrusion, and outer protrusion could be machined separately and connected after fabrication. The joint protrusion and body may be permanently affixed to each other. Portions of the joint may be immovable relative to the rest of the joint. When a joint/tube assembly is formed, the structure may be rigid and joints may prevent tubes from moving relative to each other.

The inner protrusion 214 of the joint, designed to enter into a connecting tube 213, may have centering features. Centering features may be a raised pattern on the joint protrusion designed to fit inside of a connecting tube. The centering feature may be raised from an outer surface of an inner protrusion of the acceptor port. Optionally, centering features may be on the inside region of the outer protrusion. In some implementations, the centering features may be raise from both an outer surface of the inner protrusion and an inner surface of the outer protrusion of the acceptor port. The height of a raised centering feature may be at least 0.001", 0.005", 0.006", 0.007", 0.008", 0.009", 0.010", 0.020", 0.030", 0.040", or 0.050".

Figures 3A, 3B, 3C, 3D:
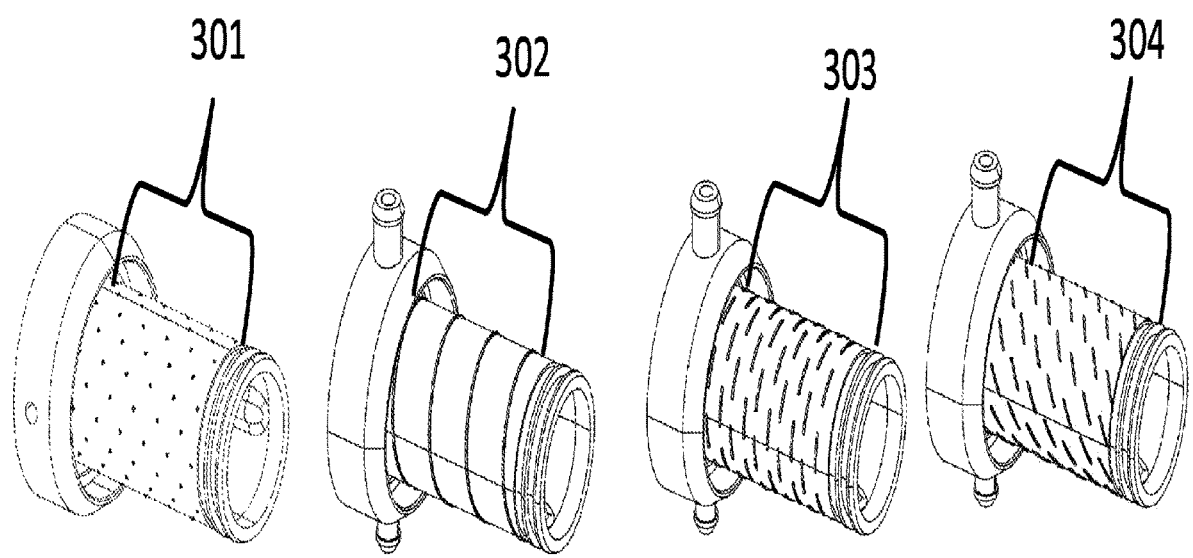
FIG. 3a shows an example of a joint protrusion with a small nubs centering feature.
FIG. 3b shows an example of a joint protrusion with a spiral path centering feature.
FIG. 3c shows an example of a joint protrusion with a labyrinth centering feature.
FIG. 3d shows an example of a joint protrusion with an interrupted helix centering feature.

FIGS. 3a-d show detailed views of four possible joint centering feature embodiments. FIG. 3a shows a small nub centering feature 301, this feature comprises a pattern of raised dots on a tube engagement region of the joint protrusion. A tube engagement region of the joint protrusion may be a portion of the joint protrusion configured to come into contact with a surface of the tube. The tube engagement region may be configured to be inserted into the tube. The dots may be provided in one or more row or column, or in staggered rows and/or columns. The raised dots may have a diameter of at least 0.001", 0.005", 0.006", 0.007", 0.008", 0.009", 0.010", 0.020", 0.030", 0.040", or 0.050".

FIG. 3b shows a spiral path centering feature 302, this feature comprises a continuous raised line that winds around the full length of the tube engagement region of the joint protrusion. The continuous raised line may wrap around the tube joint protrusion a single time or multiple times. Alternative designs may comprise centering features with a raised spiral centering feature that does not wrap around the full diameter of the tube engagement region. In alternative embodiments the spiral centering feature may wind around 10°, 20°, 30°, 40°, 50°, 60°, 70°, 80°, 90°, 100°, 110°, 120°, 130°, 140°, 150°, 180°, 190°, 200°, 210°, 220°, 230°, 240°, 250°, 260°, 270°, 280°, 290°, 300°, 310°, 320°, 330°, 340°, 350°, or the full 360° of the circumference of the engagement region. The centering feature may further comprise multiple raised lines that wind around the full length of the tube without intersecting in a fashion similar to multi-start screw threads.

FIG. 3c shows a labyrinth centering feature 303, this feature comprises raised dashed lines circumscribing the tube engagement region of the joint at a 90 degree angle to the direction of the length of the joint protrusion. Adjacent dashed lines in the labyrinth centering feature are organized in a staggered pattern. Multiple rows of dashed lines may be provided. The dashed lines may be substantially parallel to one another. Alternatively, varying angles may be provided.

FIG. 3d shows an interrupted helix centering feature 304, this feature comprises raised dashed lines circumscribing the tube engagement region of the joint at a 45 degree angle to the direction of the length of the tube engagement region. In another example, the centering feature could have a raised line circumscribing the tube engagement region at an angle of 1°, 5°, 10°, 15°, 20°, 30°, 45°, 60°, 75°, 90°, 105°, 120°, 135°, 150°, 165°, or 180°. The dashed lines in the centering features shown in FIG. 3c and FIG. 3d may have a length of at least 0.005", 0.006", 0.007", 0.008", 0.009", 0.010", 0.020", 0.030", 0.040", 0.050" or 0.100".

Other patterns in addition to those described in FIG. 3a-FIG. 3d may be used. Alternative patterns may include dashed lines at irregular angles or spacing, a combination of lines and dots, or a group of solid lines winding around the engagement region with uniform or non-uniform spacing between the lines. In some instances, the centering features may be patterned so a direct straight line may not be drawn from a distal end of an inner protrusion to the proximal end without intersecting one or more centering feature. This may force adhesive to take a more roundabout path and encourage spreading of the adhesive, as described further elsewhere herein. Alternatively, a straight line may be provided from a distal end to a proximal end of the inner protrusion without intersecting one or more centering feature.

The centering features may be added to the joint protrusion with different densities. For example, a joint protrusion may be fabricated such that 90% of the protrusion is covered with raised centering features. In the case with 90% centering feature coverage the features may be very closely spaced. Alternatively the centering features may cover at least 5%, 10%, 15%, 20%, 25%, 30%, 40%, 45%, 50%, 55%, 60%, 65%, 70%, 75%, 80%, 85%, 90%, or 95% of the protrusion. The centering features may cover less than any of the percentages described herein. The centering features may fall within a range between any two of the percentage values described herein.

The centering features may be raised such that a joint/tube assembly comprises space between an inner surface of the connecting tube and the surface of the joint protrusion designed to enter into a connecting tube. The tolerance between the inner tube diameter and the protrusion may be such that the joint and tube form a force fit connection. In the case of a force fit connection, centering features may or may not deform upon tube insertion in to the joint. The centering features may center the joint protrusion inside of a connecting tube such that the distance between the inner surface of the connecting tube and the surface of the joint protrusion may have a uniform radial thickness. Alternatively the centering features may encourage non-uniform distribution of the space between the joint protrusion and the connecting tube.

Figure 7:
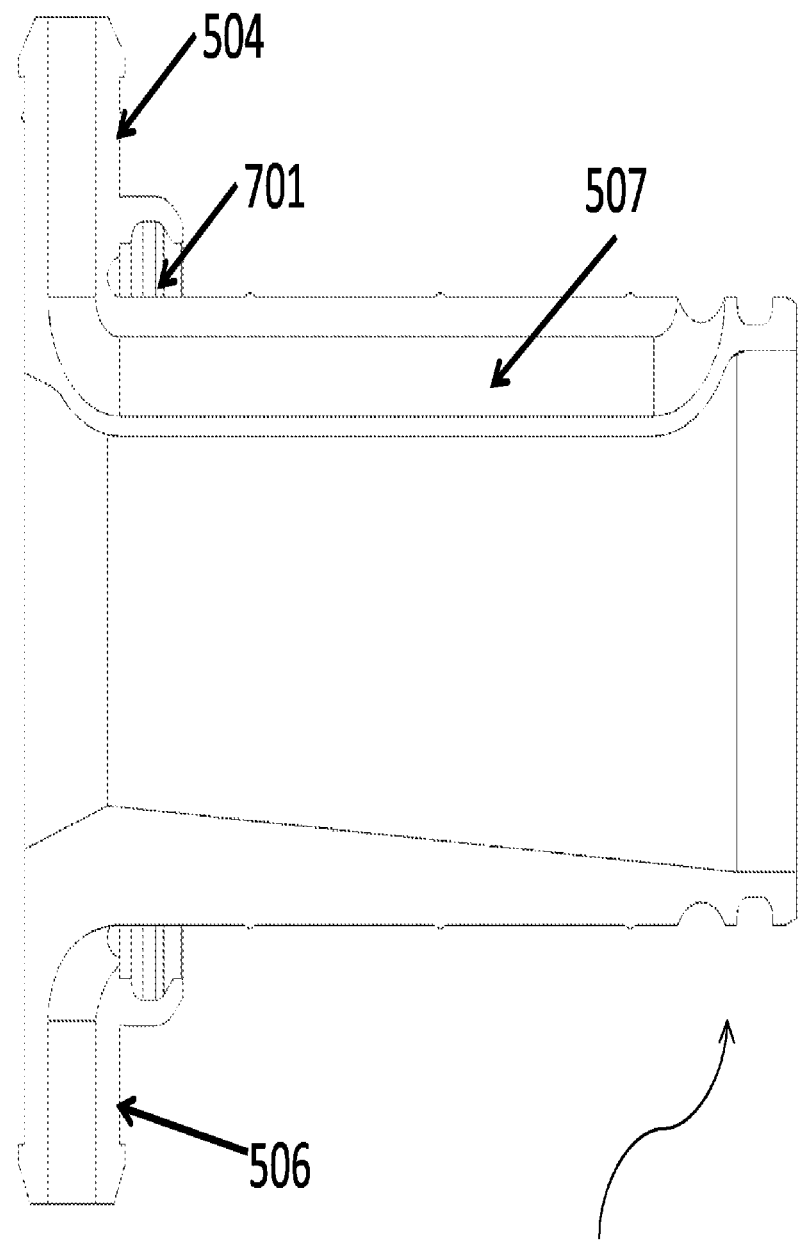
FIG. 7 shows a cross section of a joint inner protrusion that includes a seal.

In some cases, a seal can be provided on the joint protrusion. FIG. 7 shows a cross section of a joint inner protrusion that includes a seal 701. The seal can be a rubber seal. The seal can be a metal seal. The seal can be a plastic seal. The seal can be formed from a polymer material. The seal can be formed from Teflon. The seal can be provided on an end of an inner protrusion closest to the joint body. In some cases, a seal can additionally or alternatively be provided on an end of the inner protrusion that is farthest from the joint body. When a tube is fitted on the inner protrusion the seal can form an air tight, dust tight, and/or liquid tight seal between the inner protrusion and the tube. In some cases, an additional seal can be provided on the inner diameter of the tube that is connected to the inner protrusion. The tube and the joint protrusion can be sealed completely by the seal on the protrusion and/or on the tube such that an additional sealing mechanism can be omitted.

Figure 4:
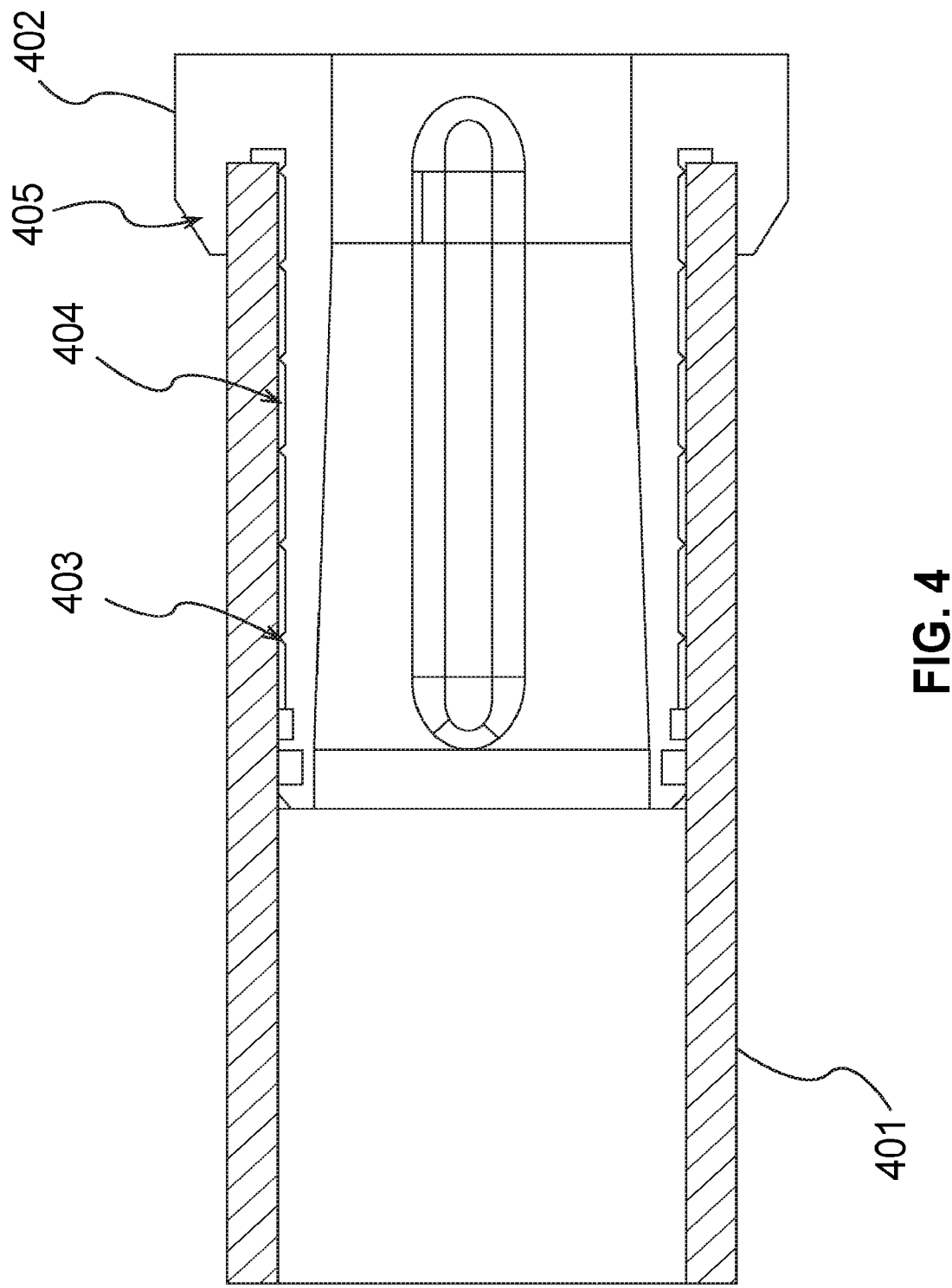
FIG. 4 shows a magnified cross sectional view of an example of a connected tube and joint showing the role of centering features and the space created between a joint protrusion surface and the inner surface of a tube.

FIG. 4 shows a detailed cross sectional view of a connecting tube 401 engaged with a joint 402 with centering features 403. The joint may have an inner protrusion that may be a small diameter engagement region of the joint. The centering features center the inner protrusion inside of a connecting tube such that the center of the connecting tube and the center of the join protrusion are co-axial. The centering features create a space 404 between an outer surface of the small diameter engagement region of the joint and the inner surface of the connecting tube. Said space may be filled with adhesive to bind the tube and joint assembly. The adhesive may be confined to the space between the outer surface of the inner protrusion of the joint and the inner surface of the connecting tube. This may be the case when the centering features are provided on the outer surface of the inner protrusion.

In some alternative embodiments, a space may be provided between an outer surface of the connecting tube and an inner surface of an outer protrusion 405 of the joint. Optionally, one or more centering features may be provided on an inner surface of the outer protrusion of the joint, which may create the space. Adhesive may fill the space between the inner surface of the outer protrusion and the outer surface of the tube. Either or both of the joint and the adhesive can be heated prior to injecting the adhesive into the space to achieve a desired flowability or viscosity of the adhesive. The centering features may have any configuration, such as those described elsewhere herein. The centering features may provide a uniform, or non-uniform space around the circumference of the tube. In some instances, stopping features may be provided, that may prevent adhesive from leaking outside the portion of the outer surface of the tube that is covered by the outer protrusion.

Adhesive may contact only the tube inner surface, only the tube outer surface, or both. In some implementations, centering features may be provided on both an outer surface of an inner protrusion of a joint and an inner surface of an outer protrusion of the joint. A space may be formed between an inner surface of the tube and an outer surface of the inner protrusion, as well as an outer surface of the tube and an inner surface of the outer protrusion. Adhesive may be used to fill both the space between an inner surface of the tube and an outer surface of the inner protrusion, and the space between an outer surface of the tube and an inner surface of the outer protrusion.

An adhesive may be used to bind the joint and tube together to form a rigid structure. The adhesive may firmly affix the joint and tube to one another in forming a vehicle chassis. The adhesive may be any flowable adhesive, such as an epoxy, glue, resin, or cement. The joint may comprise specific passages and openings to enable post-assembly injection of adhesive to specific locations.

Figure 5A:
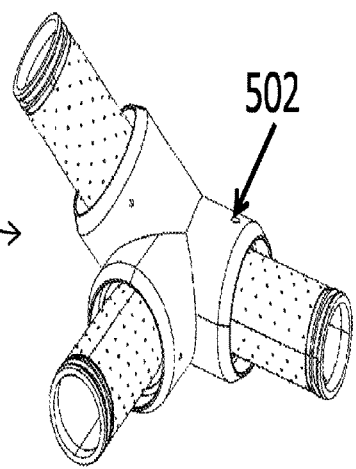
FIG. 5a shows an example of a joint with an injection orifice.
Figure 5B:
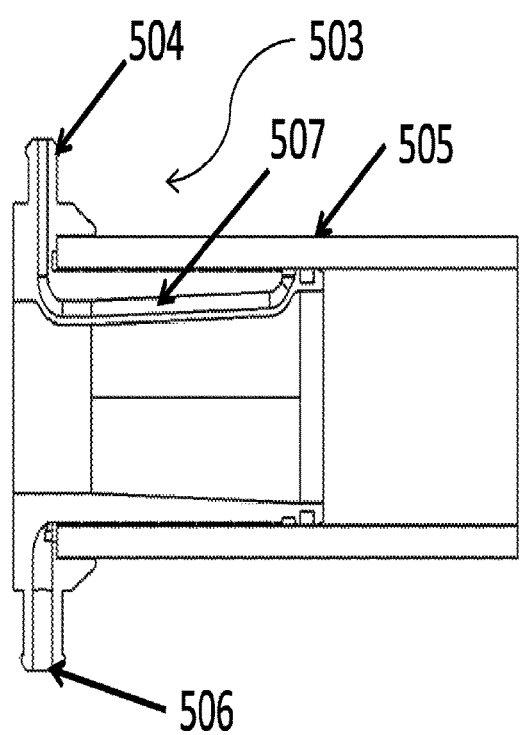
FIG. 5b shows a magnified cross sectional view of an example of an adhesive injection pathway.

FIG. 5a and FIG. 5b show features of the joints designed for adhesive injection into the space between the surface of the inner protrusion of the joint and the inner surface of the connecting tube. FIG. 5a shows a joint 501, the joint has an orifice for adhesive injection or vacuum attachment 502.

FIG. 5b shows a magnified cross sectional view of a joint 503 with a vacuum port 504 mated to a connecting tube 505. An injection port 506 may be provided opposite the vacuum port. The injection port may be provided on the joint. A vacuum port may be connected to a negative pressure source, such as a vacuum pump. An injection port may be connected to an adhesive reservoir. In some instances, a positive pressure may be exerted on or by the adhesive reservoir. The cross-sectional view in FIG. 5b shows the fluid pathway (e.g., channel) 507 inside of a wall of the inner joint protrusion 507. The fluid pathway may pull injected adhesive from an adhesive source (connected reservoir) at the injection port 506 into the space between the surface of the joint protrusion and the surface of the inner diameter of the connecting tube. Vacuum ports 504 and injection ports 506 may be positioned on opposite sides of the joint to distribute adhesive uniformly. For example, they may be provided circumferentially opposing one another on an acceptor port of a joint. They may be provided at or near a proximal end of an acceptor port for a joint. Alternatively, they may be provided at or near a distal end of an acceptor port of the joint, or any combinations thereof. A joint may have at least about 1, 2, 3, 4, 5, 10, 15, or 20 vacuum ports or injection ports on each protrusion. Vacuum and injection ports can be positioned far from, in close proximity to, or co-axially with an internal joint feature such as the fluid pathway inside of a wall of the inner joint protrusion, which may provide uniform adhesive coating. Optionally, the vacuum and injections ports may be alternatingly positioned in close proximity or co-axially with the internal node features. Vacuum and injection ports can be optimally positioned on a node to enable usage of a combined vacuum/injection tool with set vacuum/injection port spacing and geometry. The number of vacuum ports and injection ports may not necessarily have to be equal. Implementations with one vacuum port and a plethora of injection ports, or one injection port and a plethora of vacuum ports may be possible.

The distribution of the adhesive in the space may be influenced by the centering features. For example, a nub centering feature may permit maximum bond area between the joint and tube. In another case, a spiral path centering feature may generate a long path for the adhesive to flow. A spiral path centering feature may be preferable in embodiments where the adhesive needs to fill a space far from the injection site. In another case, a labyrinth centering feature may force uniform distribution of the adhesive around the tube. A labyrinth centering feature may be preferable in embodiments where uniform distribution of the adhesive is desired for structural stability. Labyrinth and interrupted helix centering features may force the adhesive to uniformly distribute upon injection by creating an internal fluid path for the adhesive which may traverse the space uniformly. In some instances, the centering features may be configured to force the adhesive to travel circumferentially around the tube. The centering features may also be configured to force the adhesive to travel along the length of the tube. Preferably, centering features may be configured to cause the adhesive to spread evenly along the surface of the tube, which may include both the circumferential and lengthwise spreading of the adhesive.

Adhesive may be injected into the space by vacuum or pressure injection. In the case of vacuum injection at least one port may be connected to a low pressure source and at least one other port may be connected to an adhesive reservoir, upon engagement of the low pressure source adhesive may be sucked into the space from the reservoir. Alternatively a port may be connected to a pressure source and adhesive may be pushed into the space.

Joints may be fabricated with nipples attached to the injection port or vacuum port 504. The nipples may connect to the pressure source, vacuum source, and/or adhesive reservoir. The nipples may be protrusions that may stick out of the joint (see, e.g., 606 of FIG. 6). Alternatively, the nipples need not protrude from the joint. The nipples may include an opening that may be fluidically connected to an internal space between a tube and one or more protrusions of the joint. The nipples may be in fluid communication with a fluid pathway 507. A nipple may be formed with an internal channel that is in fluid communication with an annular region of the acceptor port and/or a surface of the acceptor port. The internal channel may be in fluid communication with an exterior surface of an inner protrusion of the acceptor port. The internal channel may or may not be in fluid communication with an interior surface of an outer protrusion of an acceptor port. The use of nipples may simplify the injection process by removing the need for specific hardware or tools; for example fittings, nozzles, or syringes. The nipples may be removed after assembly of a structure. For example, after the adhesive has been inserted and/or hardened, the nipples may be removed. Nipples may have the form of 216 in FIG. 2*c*. The nipples may extend from the protrusion 1/16", 1/8", 1/4", 1/2", 1", 2", 3", 4", 5", or 10". Similarly they may have a diameter of 1/16", 1/8", 1/4", 1/2", 1", 2", 3", 4", 5", or 10".

Joints may comprise integrated structural features. Integrated structural features may include fluid plumbing, electrical wiring, electrical buses, panel mounts, suspension mounts, or locating features. Integrated structural features may simplify the chassis design and decrease the time, labor, parts, and cost needed to construct the chassis structure.

Joints may comprise mounting features for shear panels or body panels of a vehicle. Mounting features on the joints may allow panels to be connected directly to a vehicle chassis frame. Mounting features on the joints may be designed to mate with complimentary mating features on the panels. For example mounting features on the joints may be flanges with holes for hardware (e.g. screws, bolts, nuts, or rivets), snaps, or flanges designed for welding or adhesive application. FIGS. 6*a-c* show features of the joints designed for integration with other systems on-board a structure, such as a vehicle. Joints may be designed to integrate with shear panels or body panels of a structure.

FIG. 6*a* shows a joint 601 with a flange 602. The flange 602 may be used to connect to a shear panel or body panel (not shown). In the case of use of the joint members to construct a vehicle chassis, joint member may be integrated with a suspension system. A suspension system may comprise hydraulic, air, rubber, or spring loaded shock absorbers. The suspension system may connect to the joint member by an attachment to a flange 602.

Joints may include electrical connections. Electrical connections integrated into the joints may be electrically insulated. Electrical connections integrated into the joints may be in communication with wiring routed through the tubes connected to the joint. The electrical wiring may be used to provide power to systems on board a vehicle and/or to provide power to a battery to start or run the vehicle engine. Systems on board a vehicle that use power from the integrated joints may include, navigation, audio, video display, power windows, or power seat adjustment. Power distribution within a vehicle may travel exclusively through a tube/joint network. FIG. 6*b* shows a possible joint embodiment for routing of electrical wires throughout a structure 603. The joint shown in FIG. 6*b* has with an inlet region 604; this inlet could be used for insertion of electrical connections or wires. Electrical wires may be inserted into the inlet region and routed from the joint to the tube for transmission throughout the chassis. One or more system that may be powered using the electrical wires may connect with the wire through the inlet region.

Joints may comprise an integrated heating and cooling fluid system to provide heat and air conditioning in the vehicle chassis. Other applications may include cooling and/or heating various components of the vehicle. Integration of fluid (e.g. gas or liquid) systems into the joint/tube construction may partially or fully eliminate the need for conventional air ducts and plumbing from vehicle design. Joints may route hot or cold fluid from a production source (e.g. electric heating element, engine block heat exchanger, refrigerator, air conditioning unit, or boiler) to a location in the chassis where a passenger or vehicle operator may wish to heat or cool the interior. Joints may contain integrated components to intake hot or cold fluid from a source, distribute hot or cold fluid, and vent hot or cold fluid at a location away from the source. Joints and tubes in the assembly may be thermally insulated using fiberglass, foam insulation, cellulose, or glass wool. The joint and tube assembly may be fluid tight. In the case of a joint comprising an integrated fluid system the joint embodiment shown in FIG. 6*b* may be used. An inlet such as the one illustrated in the FIG. 604 may be used to route fluid for heating or cooling throughout a structure by means piping the fluid between a plurality of joints through the connector tubes. A cross sectional view of a joint 605 used for routing of fluid or electricity is shown in FIG. 6*c*. The passageways used for routing of fluid and electricity may be the same passageways or they may be separate. Internal node routing may keep two or more fluids separate within a node while still providing desired routing between tubes, or from tube to node-mounted connectors or features.

Joints may include integrated locating or identifying features. The features may enable automated identification or handling of the joints during assembly and processing. Examples of locating features may include a cylindrical boss (e.g. a boss with a flat and radial groove), an extruded C-shape with a cap, a bayonet or reverse bayonet fitting with a non-symmetric pin pattern, a hook feature, or other features with geometry that may uniquely define the feature orientation and position when examined. The orientation and/or position of the joint may be determined to a 6 axis pose when the locating features are examined. For example, the position of the joint in three dimensions of space and/or orientation of the joint about three or more axes may be determined.

These locating features may be interfaced to or grasped by robotic grippers or work holding tools. The interface of the joint may be fully defined once the grasping motion begins, is partially finished, or is complete. The locating features may enable repeatable and optionally automated positioning of the joints prior to and during space frame assembly. The defining geometry of the features may also enable automated systems to coordinate the motion of multiple joints along defined paths in space during insertion of tubes into the joints. At least two tubes may be inserted into multiple joints in parallel without resulting in geometric binding during assembly.

The integrated locating feature may further comprise integral identifying features. For example identifying features may be a one dimensional bar code, a two dimensional QR code, a three dimensional geometric pattern, or a combination of these elements. The identifying feature may encode information about the joint to which it is attached. This joint information may include: geometry of the joint, including the orientation of the tube entries relative to the identifying/location feature; material of the joint; positioning of adhesive injection and vacuum ports relative to the identifying/locating features; adhesive required by the joint; and joint tube diameters. The combined identifying/locating feature may enable automated positioning of joints for assembly without requiring external information to be supplied to the automated assembly cell.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A joint member comprising:
    a central hub;
    at least one acceptor port extending from the central hub and comprising (i) an inner protrusion with an outer diameter less than an inner diameter of a connecting tube, said inner protrusion sized and shaped to be inserted into an end of the connecting tube, (ii) an outer protrusion concentric with the inner protrusion and configured to fit over the end of the connecting tube; and
    one or more fluid ports connected to the at least one acceptor port, the one or more fluid ports in fluid communication with an internal channel inside of a wall of the inner protrusion.

2. The joint member of claim 1, wherein the internal channel is in fluid communication with a space between an outer surface of the inner protrusion and an inner surface of the connecting tube when the connecting tube is fitted on the inner protrusion.

3. The joint member of claim 1, wherein at least one of the one or more fluid ports is connected to an adhesive source.

4. The joint member of claim 3, wherein adhesive is provided from the adhesive source to the space between an outer surface of the inner protrusion and an inner surface of the connecting tube through the one or more fluid ports in fluid communication with the internal channel.

5. The joint member of claim 1, wherein at least one of the one or more fluid ports is connected to a negative pressure source.

* * * * *